United States Patent
Kuramori et al.

(10) Patent No.: US 6,840,294 B2
(45) Date of Patent: Jan. 11, 2005

(54) RUN-FLAT TIRE AND TIRE/WHEEL ASSEMBLY

(75) Inventors: Akira Kuramori, Hiratsuka (JP); Atsushi Tanno, Hiratsuka (JP); Masatoshi Kuwajima, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 23 days.

(21) Appl. No.: 10/617,809

(22) Filed: Jul. 14, 2003

(65) Prior Publication Data

US 2004/0025995 A1 Feb. 12, 2004

(30) Foreign Application Priority Data

Jul. 25, 2002 (JP) ........................................ 2002-216591

(51) Int. Cl.[7] ............................................. B60C 17/06
(52) U.S. Cl. ...................... 152/156; 152/158; 152/520
(58) Field of Search ................................. 152/156, 158, 152/520, 248, 249

(56) References Cited

U.S. PATENT DOCUMENTS 6,463,974 B1 * 10/2002 Hellweg et al. ........ 152/520 X
6,463,976 B1 * 10/2002 Glinz et al. .................. 152/520

FOREIGN PATENT DOCUMENTS

| JP | 10-297226 A1 | 11/1998 |
| JP | 2001-163020 A1 | 6/2001 |
| JP | 2001-519279 A1 | 10/2001 |

* cited by examiner

Primary Examiner—Adrienne C. Johnstone
(74) Attorney, Agent, or Firm—Rader, Fishman & Grauer PLLC

(57) ABSTRACT

Disclosed are a run-flat tire and a tire/wheel assembly in which the workability of the tire-to-rim fit has been improved while including a core-type run-flat support member. The tire/wheel assembly is formed by coupling a pneumatic tire and a rim of a wheel. In the tire/wheel assembly, the run-flat support member constituted of a circular shell and elastic rings is inserted into a cavity of the pneumatic tire, in which the circular shell has a support surface thereof extended toward the periphery of the tire and leg portions along each side of the support surface, and the elastic rings support the leg portions of the circular shell on the rim. At the same time, a seat portion and an engaging portion are provided for at least one of the elastic rings, in which the leg portion of the circular shell can be settled on the seat portion, and the engaging portion is extended in an outer tire axial direction from the seat portion and sandwiched between a tire bead base and a rim seat.

4 Claims, 1 Drawing Sheet

RUN-FLAT TIRE AND TIRE/WHEEL ASSEMBLY

BACKGROUND OF THE INVENTION

The present invention relates to a pneumatic tire and a tire/wheel assembly which enable run-flat traveling, and more specifically, to a run-flat tire and a tire/wheel assembly in which the workability in tire-to-rim fit has been improved.

To meet the demand from the market, numerous techniques have been proposed to enable a certain degree of emergency traveling even when a pneumatic tire is punctured while driving a vehicle. Among those numerous proposals, the techniques proposed in Japanese Patent Laid-Open Publication No. 10-297226 and Published Japanese Translation of a PCT Application No. 2001-519279 enable run-flat traveling by fitting a core to a rim in a cavity of an assembled pneumatic tire and supporting a flat tire with the core.

The foregoing run-flat core has an open-leg-structured circular shell including a support surface thereof extended toward the periphery of the tire and leg portions along each side of the support surface. The run-flat core is constituted by having elastic rings attached to both of these leg portions so that the core is supported on a rim interposing the elastic rings. The advantage of the run-flat core is that the available rims and wheels in the market can be used as its own, without any particular modification. Thus, the core can be accepted to the market without causing difficulties therein.

When fitting the core in the tire/wheel assembly, first, the core is inserted into the cavity of the pneumatic tire, and the pneumatic tire needs to be coupled to the rim of a wheel while containing the core. However, there has been a problem that it is difficult to operate tire-to-rim fit since the core is able to freely move in a tire radial direction in the cavity of the pneumatic tire. Moreover, there has been another problem that it is hard to stably install the elastic rings onto rim humps.

SUMMARY OF THE INVENTION

An object of the present invention is to provide a run-flat tire and a tire/wheel assembly, in which the workability of tire-to-rim fit has been improved while including a core-type run-flat support member.

The run-flat tire of the present invention achieving the foregoing object is characterized as follows: The run-flat support member constituted of a circular shell and elastic rings is inserted into a cavity of a pneumatic tire, in which the circular shell has a support surface thereof extended toward the periphery of the tire and leg portions along each side of the support surface, and the elastic rings support the leg portions of the circular shell on a rim. At the same time, a seat portion and an engaging portion are provided on at least one of the elastic rings, in which the leg portion of the circular shell can be settled on the seat portion, and the engaging portion is extended in an outer tire axial direction from the seat portion and sandwiched between a tire bead base and a rim seat.

Moreover, the tire/wheel assembly of the present invention is characterized as follows: The tire/wheel assembly is constituted by coupling a pneumatic tire and a rim of a wheel. In the tire/wheel assembly, the run-flat support member constituted of a circular shell and elastic rings is inserted into a cavity of the pneumatic tire, in which the circular shell has a support surface thereof extended toward the periphery of the tire and leg portions along each side of the support surface, and the elastic rings support the leg portions of the circular shell on a rim. At the same time, a seat portion and an engaging portion are provided on at least one of the elastic rings, in which the leg portion of the circular shell can be settled on the seat portion, and the engaging portion is extended in an outer tire axial direction from the seat portion and sandwiched between a tire bead base and a rim seat.

In the present invention, the outer diameter of the run-flat support member is formed to be smaller than the inner diameter of a tread of the pneumatic tire so that a constant distance is maintained between the run-flat support member and the pneumatic tire. The run-flat support member as well as the pneumatic tire are fit to the rim of the wheel while the run-flat support member is inserted into the cavity of the pneumatic tire, thereby constituting the tire/wheel assembly. The tire/wheel assembly is attached to a vehicle. When the pneumatic tire is punctured while driving, the punctured deflated tire is supported by the support surface of the circular shell of the run-flat support member. Therefore, the run-flat traveling is enabled.

According to the present invention, the seat portion and the engaging portion are provided on at least one of the elastic rings, in which the leg portion of the circular shell can be settled on the seat portion, and the engaging portion is extended in an outer tire axial direction from the seat portion and sandwiched between a tire bead base and a rim seat. Thus, since the run-flat support member inserted into the cavity of the pneumatic tire does not move around in a tire radial direction, the workability of the tire-to-rim fit is excellent. In addition, since the run-flat support member is steadily coupled to the pneumatic tire, vehicle weight is stably sustained during run-flat traveling. As a result, durability of the tire is improved for the run-flat traveling.

In the present invention, it is preferable to embed a core member in the seat portion of the elastic ring, where the core member has a higher elastic modulus than that of the elastic ring. Thus, unification of the pneumatic tire and the run-flat support member can be further improved.

DETAILED DESCRIPTION OF THE PREFERRED EMBODIMENTS

The present invention is detailed below with reference to the attached drawings.

Figure 1:
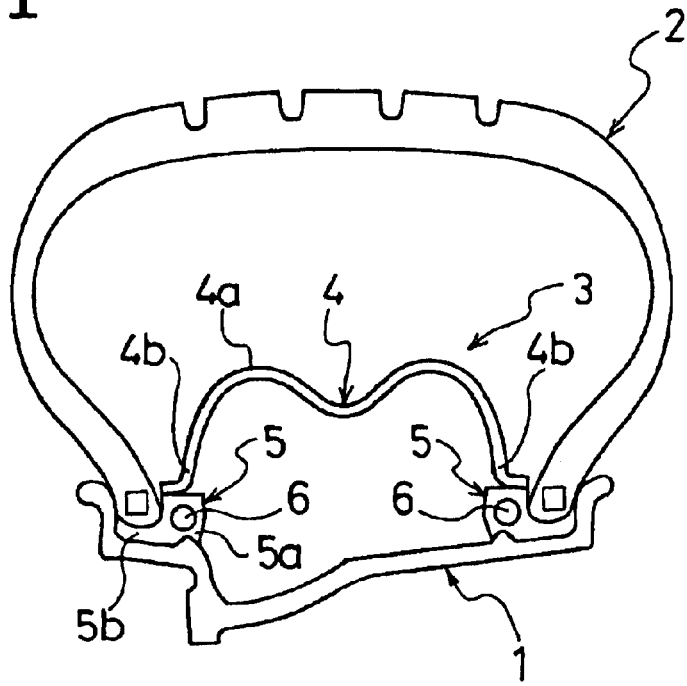
FIG. 1 is a cross-sectional view along the central meridian showing an essential part of a tire/wheel assembly formed in an embodiment of the present invention.

FIG. 1 is a cross-sectional view along the central meridian showing an essential part of a tire/wheel assembly (a wheel) formed in an embodiment of the present invention. Reference numerals 1, 2 and 3 denote a rim of a wheel, a pneumatic tire and a run-flat support member, respectively. These rim 1, pneumatic tire 2 and run-flat support member 3 are formed in a circle around a wheel rotation axis (not shown).

A circular shell 4 and elastic rings 5 constitute a main part of the run-flat support member 3. This run-flat support member 3 is separated from the inner wall of the pneumatic tire 2 under normal driving conditions. When the pneumatic tire 2 is punctured, the run-flat support member 3 supports the deflated pneumatic tire 2 from the inside.

The circular shell 4 has an open leg structure in which a continuous support surface 4a for sustaining the flat tire is extended toward the periphery of the tire (outer radial direction), and leg portions 4b and 4b are provided along each side of the support surface 4a. The support surface 4a of the circular shell 4 is shaped so that the support surface 4a has a convexly curved portion toward the periphery of the tire from a view of a cross section orthogonal to the circumferential direction. A minimum of one convexly curved portion is required, but two or more convexly curved portions are preferred to be aligned in a tire axial direction. Thus, the support surface 4a of the circular shell 4 is formed by aligning two or more convexly curved portions. Accordingly, two or more portions in contact with the inner wall of the tire can be dispersed on the support surface 4a, and localized wear on the inner wall of the tire can be reduced. Therefore, it is possible to extend a distance which a vehicle endures run-flat traveling.

The foregoing circular shell 4 is made of a rigid material in order to sustain the vehicle weight through the flat pneumatic tire 2. Metal, resin and the like are used for the constituent material. Steel and aluminum may be exemplified as the metal. As for the resin, both thermoplastic resin and thermosetting resin can be used. Examples of thermoplastic resin are nylon, polyester, polyethylene, polypropylene, polystyrene, polyphenylene sulfide and ABS. Examples of thermosetting resin are epoxy resin and unsaturated polyester resin. Resin can be used as single or fiber reinforced resin by blending reinforcing fiber.

The elastic rings 5 are respectively disposed on the inner circumferential sides of the leg portions 4b and 4b of the circular shell 4. These elastic rings 5 alleviate impacts and vibrations of the circular shell 4 caused by the punctured pneumatic tire 2. The elastic rings 5 also prevent slipping on a rim seat to stably support the circular shell 4. Each elastic ring 5 includes a seat portion 5a and an engaging portion 5b. The leg portions 4b of the circular shell 4 can be settled on the seats 5a. The engaging portions 5b are extended in an outer tire axial direction from the seat portions 5a and sandwiched between tire bead bases and rim seats. The outer diameter of the seat portion 5a is larger than the inner diameter of the pneumatic tire 2. In addition, it is preferable to set the thickness of the engaging portions 5b in a range from 1 to 5 mm. Meanwhile, the inner diameter of the pneumatic tire 2 is set larger than standard dimensions by the thickness of the engaging portions 5b.

Rubber and resin can be used as a constituent material of the elastic rings 5, and it is more preferable to use the rubber. Examples of types of rubber are natural rubber (NR), isoprene rubber (IR), styrene-butadiene rubber (SBR), butadiene rubber (BR), hydrogenated acrylonitrile-butadiene rubber, hydrogenated styrene-butadiene rubber, ethylene propylene rubber (EPDM, EPM), butyl rubber (IIR), acrylic rubber (ACM), chloroprene rubber (CR), silicone rubber and fluoro-rubber. As a matter of course, it is possible for these types of rubber to contain an additive such as filler, vulcanizer, vulcanization accelerator, softener and antioxidant as appropriate. Accordingly, desired elastic modulus can be obtained based on the blend of the rubber components.

Moreover, it is preferable to embed core members 6 in the seat portions 5a of the elastic rings 5 and to set an elastic modulus of the core members 6 higher than that of the elastic rings 5. A constituent material of the core member 6 is not particularly limited. For example, the same material used for a bead core of a pneumatic tire 2, such as a steel wire, can be employed. The embedment of the core members 6 in the seat portions 5a of the elastic rings 5 enhances the rigidity of the elastic rings 5. Accordingly, the circular shell 4 can be firmly fastened to the pneumatic tire 2.

In the tire/wheel assembly thus constituted, when the pneumatic tire 2 is punctured while driving a vehicle, the support surface 4a of the circular shell 4 of the run-flat support member 3 supports the deflated pneumatic tire 2. Thus, run-flat traveling enabled. Furthermore, when fitting the pneumatic tire 2 in the rim 1 of the wheel, the run-flat support member 3 does not move around in a tire radial direction in the cavity of the pneumatic tire. Consequently, the workability of the tire-to-rim fit is excellent. In other words, by coupling the elastic rings 5, which include the aforementioned seat portions 5a and engaging portions 5b, and the bead bases of the pneumatic tire 2 after inserting the circular shell 4 into the cavity of the pneumatic tire 2, movement of the run-flat support member 3 is limited with respect to the pneumatic tire 2. Additionally, since the run-flat support member 3 is steadily coupled to the pneumatic tire 2, the weight is stably sustained during run-flat traveling. Therefore, durability of the tire is improved for the run-flat traveling.

Figure 2:
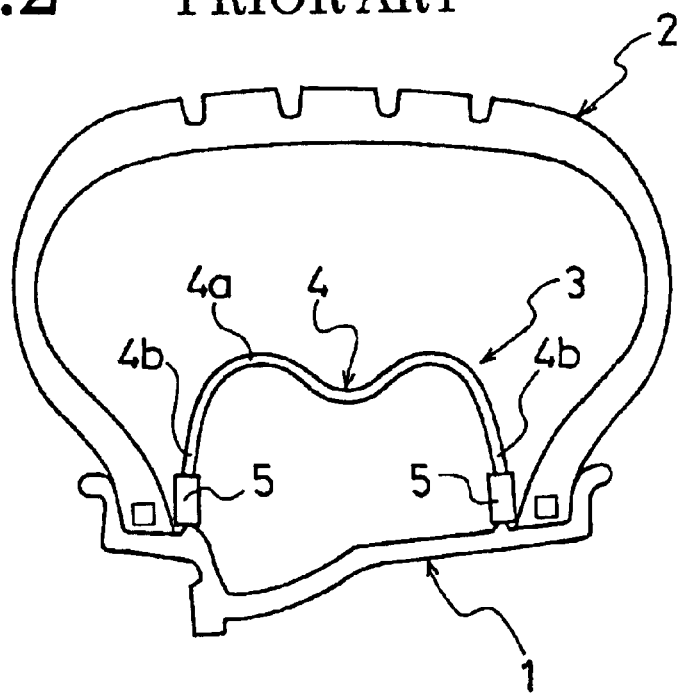
FIG. 2 is a cross-sectional view along the central meridian showing an essential part of a conventional tire/wheel assembly.

By contrast, as shown in FIG. 2, a tire/wheel assembly having a conventional run-flat function employs a run-flat support member 3 constituted of a circular shell 4 and elastic rings 5. The circular shell 4 has a support surface 4a thereof extended toward the periphery of the tire and leg portions 4b along each side of the support surface 4a. The elastic rings 5 support the circular shell 4 on a rim 1. However, since the elastic rings 5 are not coupled to bead bases of the pneumatic tire 2, the run-flat support member 3 freely moves around in a tire radial direction in a cavity of the pneumatic tire 2, and this makes the operation of tire-to-rim fit difficult. Moreover, it is difficult to stably install the elastic rings 5 on a rim hump.

In the foregoing embodiment, a case where elastic rings having seat portions and engaging portions are disposed on both the beads located on both sides has been described. However, the elastic rings having the seat portions and engaging portions are required to be disposed on at least one of the beads in the present invention. In other words, the workability of tire-to-rim fit can be improved by fastening a circular shell to a pneumatic tire in at least one of the beads. On the other bead, a conventional elastic ring can be disposed.

EXAMPLE

A tire/wheel assembly in which a pneumatic tire with a tire size of 205/55R16 89V and a wheel with a rim size of 16×6½JJ are fit was prepared. As shown in FIG. 1, a 1.0 mm-thick steel plate was processed to create a circular shell and a run-flat support member constituted of elastic rings having seat portions and engaging portions. The run-flat support member was inserted into a cavity of the pneumatic tire. Thus, the tire/wheel assembly (an example of an embodiment) was created.

For comparison, as shown in FIG. 2, a run-flat support member constituted of a circular shell and elastic rings was created, in which the circular shell had a support surface thereof extended toward the periphery of the tire and leg portions along each side of the support surface, and the elastic rings support the circular shell on a rim. Other than the employment of the run-flat support member, the tire/wheel assembly having the same structure as the assembly in the example of the embodiment was obtained (a conventional example).

Durability of the two types of the tire/wheel assemblies during run-flat traveling was evaluated by the following measurement method, and the results thereof are listed on Table 1.

[Durability During Run-Flat Traveling]

A testing tire/wheel assembly was fit in the right front wheel of a front engine/rear-wheel drive car with an engine displacement of 2.5 liter. The inner pressure of the tire was set to 0 kPa (200 kPa for other tires), and the car was driven counterclockwise at 90 km/h in a circular circuit. A distance that the car was driven was measured until the car became incapable of being driven. The results of evaluation are indicated by index numbers, where the conventional assembly is set to 100. The larger the index number is, the better the durability during run-flat traveling is.

TABLE 1

| | Conventional Example | Embodiment |
|---|---|---|
| Structure of Tire/Wheel Assembly | FIG. 2 | FIG. 1 |
| Durability During Run-Flat Traveling | 100 | 102 |

As shown in Table 1, the tire/wheel assembly of the example of the embodiment had better durability than that of the conventional example during run-flat traveling. The tire/wheel assembly of the example of the embodiment had sufficiently functioned as a run-flat tire. Moreover, since the pneumatic tire and the run-flat support member were integrally formed in the tire/wheel assembly of the example of the embodiment, the workability in tire-to-rim fit was better than that of the tire/wheel assembly of the conventional example.

According to the present invention, a run-flat support member constituted of a circular shell and elastic rings is inserted into a cavity of a pneumatic tire, in which the circular shell has a support surface thereof extended toward the periphery of the tire and leg portions along each side of the support surface, and the elastic rings support the leg portions of the circular shell on a rim. At the same time, a seat portion and an engaging portion are provided on at least one of the elastic rings, in which the leg portion of the circular shell can be settled on the seat portion, and the engaging portion is extended in an outer tire axial direction from the seat portion and sandwiched between a tire bead base and a rim seat. As a result, it is possible to improve the workability in the tire-to-rim fit while including the core-type run-flat support member.

Hereinbefore, the preferred embodiments of the present invention have been detailed. It is to be understood that various modifications, substitutions and replacements can be made without departing from the spirit and scope of the present invention defined by the appended claims.

What is claimed is:

1. A run-flat tire, including:

a run-flat support member constituted of a circular shell and elastic rings and inserted into a cavity of a pneumatic tire, the circular shell having a support surface thereof extended toward a periphery of the pneumatic tire and leg portions along each end of the support surface, and the elastic rings supporting the leg portions of the circular shell, wherein a seat portion, on which the leg portion of the circular shell can be settled, and an engaging portion, extended in a tire axial direction from the seat portion and sandwiched between a tire bead base and a rim seat, are provided on at least one of the elastic rings.

2. The run-flat tire according to claim 1, wherein a core member having a higher elastic modulus than that of the elastic rings is embedded in the seat portion of the elastic ring.

3. A tire/wheel assembly, in which a pneumatic tire is coupled to a rim of a wheel, including:

a run-flat support member constituted of a circular shell and elastic rings and inserted into a cavity of the pneumatic tire, the circular shell having a support surface thereof extended toward a periphery of the pneumatic tire and leg portions along each side of the support surface, and the elastic rings supporting the leg portions of the circular shell, wherein a seat portion, on which the leg portion of the circular shell can be settled, and an engaging portion, extended in a tire axial direction from the seat portion and sandwiched between a tire bead base and a rim seat, are provided on at least one of the elastic rings.

4. The tire/wheel assembly according to claim 3, wherein a core member having a higher elastic modulus than that of the elastic rings is embedded in the seat of the elastic ring.

* * * * *